Patented May 25, 1937

2,081,172

UNITED STATES PATENT OFFICE 2,081,172

MANUFACTURE OF ARTIFICIAL MATERIALS

Henry Dreyfus, London, England

No Drawing. Application June 13, 1934, Serial No. 730,475. In Great Britain June 23, 1933

8 Claims. (Cl. 8—20)

This invention relates to processes wherein filaments, threads, ribbons and like materials having a basis of cellulose acetate or like filament-forming base are treated with liquid softening agents and stretched.

Processes of this type are described in U. S. application S. No. 378,684 filed 16th July, 1929, according to which filaments and threads of cellulose acetate or other organic derivatives of cellulose, are treated with a stretch-assisting agent, for example an organic solvent for the cellulose derivative, and stretched, to an extent which may vary from 10% to over 100% of their original length, in the course of their travel between two points, e. g. during a winding operation. This continuous method presents a very advantageous means of applying the treatment, which may be applied so as very considerably to increase the tensile strength of the materials, besides improving their properties in other respects, for example increasing their resistance to the delustring action of hot aqueous media.

In carrying out the stretching process the stretch-assisting agent applied must be capable of softening the material sufficiently to allow it to undergo the desired stretch without damaging it. For this purpose it is most convenient to employ mixtures of two or more liquids having different solvent powers for the material. The stretch-assisting agent may for example comprise a relatively strong solvent or swelling agent for the material, in admixture with a non-solvent diluent therefor. I have found that in determining the composition of the stretch-assisting agent to be used under any particular conditions, it is not sufficient to have regard merely to the solvent power of the various constituents of the liquid but that the volatility of such constituents must also be taken into account. It might be thought possible to employ a mixture comprising a solvent or swelling agent and a diluent of markedly different volatility without disadvantage, provided that the mixture were continuously enriched during the process with fresh quantities of the more volatile constituents to replace those lost by evaporation. I have found, however, that this is not so, and that the strength and uniformity of the materials is liable to be deleteriously affected even by very small changes in the solvent power of the mixture.

According to the present invention, filaments, threads, yarns, ribbons and like materials having a basis of cellulose acetate or like filament-forming bases are softened by treatment with a mixture consisting substantially of two or more liquids of different solvent power for the film-forming base but of substantially the same volatility, and are stretched in the softened state. The constituents of the mixture should be of such volatility that the solvent power of the mixture does not, owing to evaporation, substantially increase, and preferably remains substantially constant throughout the temperature range to which the materials are subjected during the treatment and particularly during the stretching operation.

As examples of suitable softening liquids for cellulose acetate at temperatures between about 25° C. and 35° C., I may mention mixtures of methyl-ethyl-ketone or ethyl acetate with benzene or with cyclohexane. The invention does not exclude the use of treating liquids containing small proportions of agents of different volatility from that of the major portion of the liquid, provided the mixture is such that its solvent power does not alter substantially as a result of evaporation during the process. Thus, for example, the effectiveness of a mixture of ethyl acetate and benzene as a softening agent can be considerably increased by the addition of small amounts of alcohol, e. g. from 2–5 or 10%.

The softening and stretching operations are preferably carried out continuously during the travel of the materials between two points, according to the method of U. S. application S. No. 378,684, and may with advantage be effected simultaneously. Where possible the materials are treated in warp formation, for example in apparatus of the type described in U. S. application S. No. 602,844 filed 2nd April, 1932. The material may be treated prior to the application of the stretch-assisting agent proper with another agent having a softening effect on the material, for example an agent containing a lower concentration of the solvent or swelling agent present during the stretching operation, as described in U. S. application S. No. 688,499 filed 7th September, 1933.

It is of advantage that any pretreating agent employed should fulfill the same conditions as to the volatility of its constituents as the agent in the presence of which the materials are stretched.

With a view to increasing the rate at which the material is softened by the stretch-assisting agent the materials may be subjected, prior to treatment with the said agent or with any pretreating agent applied, to a process wherein the amount of water or other non-solvent liquid contained by the materials is removed or substantially reduced.

The following examples illustrate the invention:

Example 1

Cellulose acetate artificial silk is drawn in the form of a warp or sheet of yarns from a creel and through a bath containing a 90 to 95% mixture of ethyl acetate with benzene, by means of two sets of rollers situated in the bath. The rollers are so spaced apart and driven at such speeds that each portion of the material is in contact with the bath for approximately two minutes. The speed of the second set of rollers is twice that of the first set, so that the material is stretched to approximately 200% of its original length. The temperature of the bath is about 25°–35° C.

Example 2

The process is carried out as described in Example 1, except that the bath contains 88% of ethyl acetate, 2% of alcohol and 10% of benzene, and the speed of the second set of rollers is adjusted to stretch the material to 250% of its original length.

Example 3

The process is carried out as in Example 1, except that the bath contains 90% of ethyl acetate, 5% of alcohol and 5% of cyclohexane.

Example 4

The process is carried out as in Example 1, except that the bath contains a 60–70% mixture of methyl ethyl ketone with benzene.

Example 5

The process is carried out as in Example 1, except that the bath contains a 65–75% mixture of methyl ethyl ketone with cyclohexane.

In all these examples stretching may be effected in two or more stages by employing three or more sets of rollers in the bath. These may be arranged to rotate at progressively increasing speeds along the path of the materials. On the other hand, the arrangement may be such that between two stages of stretching the material is allowed to travel for some distance at a uniform speed as described in U. S. application S. No. 573,424 filed 6th November, 1931.

The most important application of the invention is in the treatment of materials having a basis of cellulose acetate. The invention is, however, also applicable to the treatment of materials made of other film-forming bases of a like nature, that is to say other film-forming bases which are relatively inelastic and can be softened by treatment with suitable organic liquids and permanently stretched to a considerable extent while in the softened condition. The base of the materials treated may, for example, be nitro-cellulose, cellulose formate, propionate, butyrate, ethyl, methyl or benzyl cellulose, ethyl cellulose acetate, oxyethyl cellulose acetate or other stable derivative of cellulose.

The cellulose acetate or other base material may be of low, medium or high viscosity. Thus for example, taking the viscosity of glycerine at 25° C. as 100, a cellulose acetate may be used the viscosity of which in a 6% solution in acetone is below 10, or between 10 and 20, or between 20 and 30, or between 30 and 50, 100, or even 200.

What I claim and desire to secure by Letters Patent is:—

1. Process for improving the properties of textile materials, which comprises softening artificial filaments, threads, yarns and the like containing an organic derivative of cellulose by treatment with a mixture consisting substantially of at least two liquids of different solvent powers for the organic derivative of cellulose but having substantially the same volatility at the operating temperature, and stretching the softened materials.

2. Process for improving the properties of textile materials, which comprises softening artificial filaments, threads, yarns and like materials containing an organic derivative of cellulose by a bath treatment with a mixture consisting substantially of two non-aqueous liquids of substantially the same volatility at the operating temperature one being a solvent for the organic derivative of cellulose and the other a non-solvent therefor, and stretching the softened materials.

3. Process for improving the properties of textile materials, which comprises softening artificial filaments, threads, yarns and like materials containing an organic derivative of cellulose by a bath treatment with a mixture consisting substantially of two non-aqueous liquids of substantially the same volatility at the operating temperature, one being a solvent for the organic derivative of cellulose and the other a non-solvent therefor, the non-solvent having slightly greater volatility than the solvent at the operating temperature and stretching the softened filaments.

4. Process for improving the properties of textile materials, which comprises softening artificial filaments, threads, yarns and like materials of cellulose acetate by treatment with a mixture consisting substantially of at least two liquids of different solvent powers for the cellulose acetate but having substantially the same volatility at the operating temperature, and stretching the softened materials.

5. Process for improving the properties of textile materials, which comprises softening artificial filaments, threads, yarns and like materials of cellulose acetate by a bath treatment with a mixture consisting substantially of two non-aqueous liquids of susbtantially the same volatility at the operating temperature, one being a solvent for the cellulose acetate and the other a non-solvent therefor, and stretching the softened materials to at least 200% of their original length.

6. Process for improving the properties of textile materials, which comprises softening artificial filaments, threads, yarns and like materials of cellulose acetate by a bath treatment with a mixture consisting substantially of ethyl acetate and benzene, and stretching the softened materials at temperatures of 25–35° C.

7. Process for improving the properties of textile materials, which comprises softening artificial filaments, threads, yarns and like materials of cellulose acetate by a bath treatment with a mixture consisting substantially of ethyl acetate and cyclohexane, and stretching the softened materials at temperatures of 25–35° C.

8. Process for improving the properties of textile materials, which comprises softening artificial filaments, threads, yarns and like materials of cellulose acetate by a bath treatment with a mixture consisting substantially of methyl ethyl ketone and cyclo-hexane, and stretching the softened materials at temperatures of 25–35° C.

HENRY DREYFUS.